LOW LEVEL FREQUENCY DIVIDING NETWORK

Filed Oct. 7, 1959

INVENTOR.
HENRY O. WOLCOTT
BY Harry R. Lubcke
AGENT 3,067,390
Patented Dec. 4, 1962

3,067,390

LOW LEVEL FREQUENCY DIVIDING NETWORK

Henry O. Wolcott, S. Pasadena, Calif., assignor to Optimation, Inc., Inglewood, Calif., a corporation of California Filed Oct. 7, 1959, Ser. No. 844,967
5 Claims. (Cl. 330—126)

My invention relates to frequency dividing networks and particularly to networks used for separating audio frequency electrical energy, so that low frequency energy can be segregated to excite a low range loudspeaker and high frequency energy can be segregated to excite a high range loudspeaker. Such networks are popularly known as "cross-over" networks when connected directly to loudspeakers. I prefer to divide the frequencies into two ranges at a low signal level, as at the input to separate high and low frequency amplifiers.

When the signal energy is thus divided it is possible to accomplish a relatively perfect division, both as to amplitude and phase. When a cross-over network is connected directly to a loudspeaker the variation of reactance of the latter prevents a high degree of perfection of frequency division. This is because the mechanical resonance characteristics of the loudspeaker react back upon its electrical characteristics.

Accordingly, the frequency dividing network of this invention is placed at the inputs of two audio frequency amplifiers, each provided with a suitable loudspeaker or group of loudspeakers. The network determines that the high frequency range of signals shall be amplified and reproduced by one amplifier-speaker combination and the low frequency range by the other.

The prior art has tended to employ approximations for low level cross-over networks, such as the known RC network which employs only resistance and capacitance.

A cross-over characteristic having an ultimate fall-off or slope on both sides of twelve decibels per octave is to be desired. Less than this amount does not give sufficient separation effect between the low and the high frequency loudspeakers. More than this amount gives a peculiar sounding effect. If more than one section of an RC network is employed this slope can be accomplished, but it is impossible to obtain constant power and/or constant phase difference as a function of frequency.

With an LCR (inductance, capacitance and resistance) network with these elements in series, it is possible to obtain constant power as a function of frequency, an ultimate slope of 12 db per octave and 180° constant phase difference under the theoretical conditions of no load on the reactive elements. In practice, however, where the low frequency loudspeaker is connected across the capacitor and the high frequency loudspeaker across the inductor, the shunting effect of these largely resistive impedances decreases the fall-off slope to 6 db per octave and the phase difference to 90°.

If the LCR network is employed at low level, as I propose, there need not be any appreciable loading, but then a grounded input lead for the signal return circuit is not possible for both of the amplifiers involved. In other words, if the low frequency amplifier is connected between ground and the junction of the capacitor and inductor it will have a normal single-ended input connection, but the high frequency amplifier will have to be "up in the air" by having to be connected exclusively across the inductor.

The art has attempted to solve this problem by providing two identical LCR networks and taking the low frequency signal input to one amplifier from across the capacitor of one of the seriesed LCR networks in which the capacitor is connected next to ground, and by taking the high frequency signal input to the other amplifier from across the inductor, in which second series the positions of inductor and capacitor have been interchanged so that one end of the second inductor is connected to ground.

However, these arrangements are not without disadvantages. In the first place, twice as many components are required as in the ideal case, doubling the cost and size of the network. What is more serious is that unless the three components are quite accurately correspondingly identical for each part of the network, the cross-over curves will not be of the same shape and the desired amplitude and phase response and the constancy of power for the cross-over region of the audio spectrum will not be attained.

I am able to overcome all these shortcomings in a low level frequency dividing network by an additional circuit element or a modification of an element of the single series LCR ideal combination.

Briefly, this is accomplished by altering the inductor to be a high frequency audio transformer of one to one or other turns ratio. This alteration makes it possible to ground one terminal of the transformer secondary and thus obtain a normal feed to the high frequency audio amplifier. A high frequency transformer is a simple and inexpensive component and one that can easily be constructed to have high fidelity.

Another way in which I obtain all the advantages of the ideal frequency dividing network is to employ a full band-width high fidelity audio frequency transformer and place the LCR series network across the secondary. The junction between the capacitor and the inductor is grounded; thus, both low and high frequency separate amplifiers can be provided with conventional single-ended inputs.

Still another way in which I can employ the ideal network is to employ a differential amplifier for the input stage of the amplifier not having the grounded component of the LCR series. If the capacitor has one terminal grounded the low frequency amplifier is single-ended as usual but the high frequency amplifier has a differential input across the inductor. The inverse of these connections can also be arranged; one terminal of the inductor is grounded, the high frequency amplifier is usual and the low frequency amplifier across the capacitor is differential. A differential input amplifier, of course, accepts a signal without regard to ground. The necessary A.C. or signal ground is made at the end of the unbypassed cathode resistor thereof that is opposite to the common cathodes.

Still another arrangement employs an audio frequency transformer with an ungrounded or "floating" primary connected across the ungrounded series reactive element. The secondary thereof may be grounded at one terminal to feed a single-ended input amplifier.

An object of my invention is to provide a high fidelity frequency dividing network.

Another object is to provide a frequency dividing network that remains in proper adjustment.

Another object is to provide a low level frequency dividing network having a roll-off of ultimately twelve decibels per octave and which inherently has a symmetrical characteristic above and below the cross-over frequency.

Another object is to provide a frequency dividing network having a constant phase difference of 180°.

Other objects will become apparent upon reading the folowing detailed specification and upon examining the accompanying drawings, in which are set forth by way of illustration and example certain embodiments of my invention.

Figure 1:
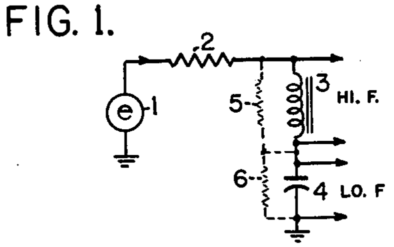
FIG. 1 shows the basic idealized low level frequency dividing network.

In FIG. 1 numeral 1 indicates the classic equivalent voltage generator of the vacuum tube feeding the low level frequency dividing network. Resistor 2 provides the resistive component of the network proper. Included therein are the resistances of the vacuum tube plate impedance, the ohmic resistance of inductor 3 and any other equivalent series resistances. The value of the actual resistor component is only the difference between the required value and the sum of all the other equivalent series resistances in the circuit. Obviously, the ohmic resistance of the inductor may be relatively high and thus the inductor be inexpensive and small.

The inductor should have a low value of eddy current loss for best fidelity performance of the dividing network. The eddy current loss manifests itself as equivalent shunt resistance. In order that the voltage at signal frequencies far from crossover be the same in the system the resistance across the capacitor 4 must be the same as the resistance across the inductor 3. Since the shunt resistance of practical capacitors is inherently a high value and thus of negligible effect in the circuit, it may be necessary to place an actual resistor across the capacitor. In FIG. 1 the equivalent shunt resistance of the inductor is represented by the dotted resistor 5 and the resistor that may be placed across the capacitor to accomplish the balance mentioned is represented by dotted resistor 6.

Although voltage balance can easily be obtained in this manner, the lower the resistance values that need to be employed the greater will be the departure from the ideal performance of my network; i.e., the phase being reduced to, say, 175°, instead of the ideal 180°, and the shape of the roll-off curve being inferior. Accordingly, eddy current losses in the inductor should be minimized and a near-ideal situation can be achieved in practice with attention to this matter.

I have derived expressions for the values of the load impedance $R_x$ and of the series resistance $R_2$ (element 2 in FIG. 1) in terms of the other parameters shown in FIG. 1.

We assume that $R_5=R_6$, since it is invariably desired that the voltage from the high frequency output of the frequency dividing network be equal to that from the low frequency output.

$$X_L=-X_C$$

at resonaance, the frequency of cross-over, and $$Q=\frac{wL}{R_2}$$

where $w=2\pi f$ as usual.

In forming the Q term the simplifying assumption is made that $$R_5=R_6=\text{infinite}$$

$$R_x=\frac{R_5R_6}{R_5+R_6}$$

Introducing the reactances involved through Q terms and simplifying:

$$R_x=\frac{wL^2}{\left(\frac{wL}{Q}-R_2\right)}$$

If $Q=0.707$, which gives 3 db attenuation at the cross-over frequency and thus a constant power output in the sum of the two halves of the system:

$$R_x=\frac{wL^2}{\sqrt{2}wL-R_2}$$

This value is determined by the quality of the components used and an effort should be made to keep this high in value.

By algebraic transformation there is determined the expression for $R_2$:

$$R_2=\frac{R_x-QwL}{\frac{QR_x}{wL}}$$

Again, if $Q=0.707$:

$$R_2=\sqrt{2}wL-\frac{wL^2}{R_x}$$

In a practical example the value for $R_2$ is determined as follows:

The parameters are:

$R_5=R_6=5\times10^5$ ohms; frequency of cross-over=400 cycles; $L=1$ henry; $Q=0.707$; $R_2=3540-25.2=3514.8$ ohms.

The second term, −25.2, indicates the reduction of the series resistance value because of the equivalent series resistance of the two half-megohm resistances across the inductor and the capacitor.

Figure 2:
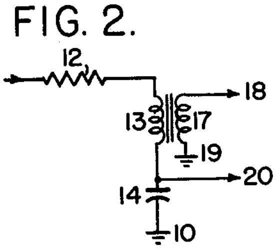
FIG. 2 shows a practical variation of the same.

The above considered basic circuit of FIG. 1 may be used for a practical embodiment as will be seen below, but FIG. 2 shows a more convenient arrangement. The mathematical relations of the essential components are the same in all cases.

In FIG. 2 resistor 12 is the equivalent of series resistor 2 in FIG. 1. Similarly, the inductor is 13 and the capacitor 14, with the whole series connected. However, the inductor is embodied in a one-to-one transformer, having secondary 17. The secondary connects to the high frequency amplifier at 18 and is grounded at 19. This allows the high frequency amplifier (not shown) to be of conventional single-ended input design. The low frequency amplifier is likewise connected at 20, and the ground at 10 allows this amplifier to also be of conventional single-ended input design.

Transformer 13—17 is required to have only high frequency response, as above 400 cycles only, if this be the frequency of cross-over. The transformer is therefore small and relatively inexpensive. For best frequency response the primary and secondary thereof should be tightly coupled. This is best accomplished with a bifilar winding of the primary and secondary coils. The capacitance between the primary and the secondary due to the bifilar construction has the same effect as though it was across the main capacitor 14, thus reducing this value slightly for any specific embodiment and not introducing any deleterious effects.

Figure 3:
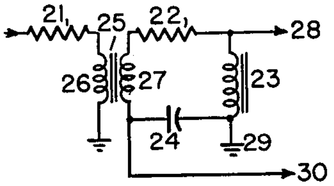
FIG. 3 shows an alternate practical variation of the same.

In FIG. 3 another embodiment is shown that allows both amplifier inputs to be grounded for conventional single-ended inputs. This is accomplished by employing a transformer 25, which transformer handles both the high and low frequency ranges of the high fidelity signal. Accordingly, it must be a high fidelity transformer having full frequency range of response. A one-to-one turns ratio is suitable, but the ratio may be any that satisfies other conditions of any particular embodiment. For example, it may have a step-up ratio to increase the voltage amplification of the system, or a step-down ratio to accommodate a low impedance input, as encountered in the use of transistorized amplifiers.

Resistor 21 is in series with primary 26 of the transformer. Resistor 22 is in series with inductor 23 and capacitor 24 across the secondary 27 of the transformer. For a one-to-one transformer the resistance value of resistors 21 and 22 forms the mathematical entity; resistance 2 of FIG. 1. The proportion of the total resistance allocated to the primary and to the secondary may be adjusted to optimize the high frequency response of the transformer by making these values equal, or otherwise depending upon transformer parameters. The low frequency response of the transformer is optimized if all of the resistance is placed in the secondary circuit.

When the ratio of the transformer is other than one-to-one the transformation ratio enters into the resistance values, and:

$$R_2 = R_{22} + \left(\frac{N_s}{N_p}\right)^2 R_{21}$$

where: $N_s$=no. turns in secondary; $N_p$=no. turns in primary.

Transformer 25 must be designed to introduce a minimum of phase, frequency and amplitude distortion for high fidelity systems, but being associated with a low level frequency dividing network the signal level is low.

Figure 4:
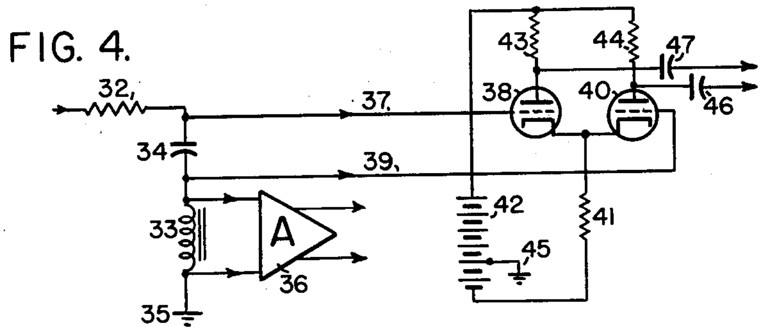
FIG. 4 shows another alternate employing a low frequency differential amplifier.

As has been mentioned, the absence of a ground connection to one amplifier in the basic circuit of FIG. 1 can be overcome by employing a differential amplifier stage as the input stage of that amplifier. In FIG. 4 the capacitor is the element lacking the ground connection at one terminal. Series resistor 32 occupies the top position in the series, as before, capacitor 34 is next in line and inductor 33 is connected between the capacitor and ground 35. Connection to high frequency amplifier 36 is made across the terminals of inductor 33, one of which is grounded, and so the usual single-ended input may be used for amplifier 36. Were a single ended amplifier connected to the top terminal of capacitor 34 the grounded terminal of the single-ended amplifier would arrange the circuit so that the input was across both the capacitor and the inductor and so no frequency division would be accomplished.

For this reason a connection 37 is taken from the upper terminal of capacitor 34 to the grid of vacuum tube 38 and a connection 39 taken from the lower terminal of the capacitor to the grid of vacuum tube 40. These vacuum tubes are connected as a differential amplifier, that is, having a common unbypassed cathode resistor 41. This resistor is normally of relatively high resistance value, say of the order of one hundred thousand ohms, and so it is connected to the negative terminal of a power supply to impose a proper operating potential upon the cathodes. In FIG. 4 this power supply is represented by battery 42, but this may be a rectifier-filter power supply as often used in the art.

The positive terminal of battery 42 or equivalent connects to plate output resistors 43, 44 and thence to the respective plates of vacuum tubes 38, 40. A ground connection 45 is made to battery 42 at the point giving a proper division of supply voltage between the cathode resistor and the plate resistors; such as minus 100 volts for the former and plus 300 volts for the latter. The ground 45 provides a potential reference to the differential amplifier stage but it is completely independent of the input circuits of grids of vacuum tubes 38, 40. It is necessary that resistor 32 be returned to ground to prevent connection 37 from floating. This is accomplished by connecting this to a cathode-follower driving stage or by a CR grid coupling type circuit.

It will be understood that because of the common unbypassed cathode resistor the current through the plate circuit of one of the tubes 38, 40 must go down when the other goes up; thus a push-pull type of signal is developed at these plates from the incoming signal across capacitor 34. This can be taken from the stage as a single-ended signal by means of capacitor 46 connected to the plate of tube 40, or a push-pull output can be taken by including the signal from the plate of tube 38 through a companion capacitor 47.

In this way I can utilize the simple LCR frequency dividing network in practical circuits and obtain all of its inherent advantages.

Figure 5:
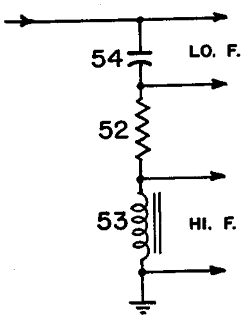
FIG. 5 shows a still further alternate of FIG. 4.

The alternate embodiment of FIG. 5 is the same as that of FIG. 4 save that the relative series positions of resistor and capacitor are interchanged. Capacitor 54 is connected to the signal source, resistor 52 is next in the series circuit and inductor 53 is last, with one terminal connected to ground. The connections to the amplifiers and the types of amplifiers are the same as in FIG. 4. This circuit has the advantage when the low frequency amplifier, for instance, is at a considerable distance from my frequency dividing network and is connected thereto by shielded leads with the shield grounded. A low impedance signal source, such as a cathode-follower, is employed and connects at the top of capacitor 54. Since the impedance (resistance) of resistor 52 is considerable with respect to the impedance of the low impedance source the additional capacitance to ground because of the shielded leads is not impressed across the inductor 53 and high frequencies of this circuit are not bypassed.

Figure 6:
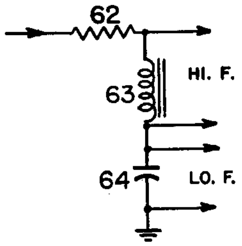
FIG. 6 shows an alternate employing a high frequency differential amplifier.

Another alternate embodiment is that of FIG. 6, in which the positions of the inductor and capacitor are interchanged with respect to the positions occupied in FIG. 4. In FIG. 6 resistor 62 has the same position as resistor 32 in FIG. 4. However, inductor 63 is next in the series circuit, followed by capacitor 64, one terminal of the latter being connected to ground. This arrangement makes the low frequency amplifier, connected across the capacitor, a single-ended device. On the other hand, the high frequency amplifier, connected across the inductor, is now a differential amplifier. The completion of these amplifier circuits in the manner of FIG. 4 will be understood.

Advantages of my single LCR network have been pointed out, including the fact that the two sides of the transfer characteristic are always of the same shape, being mirror images one of the other. If the reactances of the reactive elements change the resonant frequency thereof will change and so the cross-over frequency. However, the shape of the curves at cross-over will not importantly change, nor will the 180° phase difference be altered, giving a desirable stability to my network. If it is desired to adjust the response at cross-over frequency the resistor $R_2$ is altered in value. Normally, it is desired that this be down 3 db at cross-over so that the total audio power output will be uniform over the whole frequency range. This response is obtained when the resistance $R_2$ is the square root of two times the reactance of the inductor (at cross-over). The Q is then 0.707.

If one loudspeaker drives the other; i.e., the low and the high frequency speakers are acoustically coupled, it is desirable that the resistance be twice the inductive reactance. This is a Q of 0.5.

The requirements for high fidelity performance have largely been set forth above, and these are rather easily met because of the low signal level present at an input network rather than with the high signal level at an output network. The inductor should have stability of inductance value as a function of audio signal level. Distortion of the signal waveform should also be a minimum. This tends to have its greatest value in the high frequency channel at the cros-over frequency and at maximum amplitude of signal because the flux density is then highest. Low distributed capacitance of the inductor windings per se should be low in that this sets a limit on the high frequency response and on the maximum high frequency attenuation in the low frequency channel. The core loss (eddy currents) has already been mentioned. In general this can be kept to a low value if a fairly large air gap is employed with conventional magnetic core materials. High nickel steel is to be preferred, although ferrites and powdered iron may also be used.

In my network the cross-over frequency can be adjusted by changing only the value of the resistor and the value of either the capacitor or the inductor.

The significance of a 180° constant phase difference is appreciated by those skilled in the art in that by a simple reversal of the signal polarity of the low frequency loudspeaker (or loudspeakers) with respect to the high frequency loudspeaker (or loudspeakers) the phase difference is maintained at 0° at all frequencies near cross-over. This is of importance in high fidelity reproduction and even of greater significance in stereo reproduction. Networks of the prior art that give but a 90° phase difference at cross-over can be made to give only proper phase performance at cross-over by careful placement of the high and low frequency loudspeakers. The phase performance at frequencies even only slightly away from the cross-over frequency is incorrect.

In the matter of definitions, the high frequency response characterizing transformer 13, 17 of FIG. 2 may also be referred to as being a high frequency transfer characteristic. A resistive element is commonly embodied as a resistor, but it may also be an electrical network having reactive elements but only a resistive impedance across its terminals. In arriving at a condition of constant power it will be understood that in the general case such power is vectorially summed (i.e., vectorially added).

Although specific examples of voltages and specific values for the circuit elements have been given in this specification to illustrate the invention, it is to be understood that these are by way of example only, and that reasonably wide departures may be taken therefrom without departing from the inventive concept. Other modifications of the circuit elements, details of circuit connections and alteration of the coactive relation between elements may also be taken under my invention.

Having thus fully described my invention and the manner in which it is to be practiced, I claim:

1. In a high fidelity audio amplifier system having separate low frequency and separate high frequency amplifier channels and a single source of input signal;
only one frequency dividing input network comprising only one resistor,
only one inductive element,
and only one capacitor,
said resistor, inductive element, and capacitor connected in a single series circuit across said source of input signal,
only one of the interconnections of the group composed of said inductive element and said capacitor connected to ground,
only a first amplifier input connected only across said inductive element for amplification of the high frequency part of the audio frequency spectrum of the signal from said source of input signal,
and only a second amplifier input connected only across said capacitor for amplification of the low frequency part of said audio frequency spectrum;
one of the group composed of said first and second amplifiers having an input stage balanced with respect to ground
and an impedance across which said input signal appears connected in the ground lead of said input stage.

2. In a high fidelity audio frequency amplifier system having separate low frequency and separate high frequency amplifier channels and a single source of input signal,
a frequency dividing network comprising,
a resistive element,
an inductively reactive element,
and a capacitatively reactive element,
said elements connected in a single series circuit between said source of input signal and signal ground, only the said reactive element adjacent said signal ground connected across the input of a single-ended input amplifier for the separate amplification of one portion of the frequency spectrum of the signal from said single source of input signal,
and only the other of said reactive elements connected across the input of a differential input amplifier
having in its common connection to said signal ground a resistor of resistance value greater than the resistance value of said resistive element for the separate amplification of the remaining portion of said frequency spectrum.

3. The frequency dividing network of claim 2
wherein the input of said single-ended amplifier is connected across said inductively reactive element,
and the input of said differential amplifier is connected across said capacitatively reactive element.

4. The frequency dividing network of claim 2 in which the order of series connection of the elements thereof between said single source of input signal and signal ground is
capacitative, resistive and inductive.

5. In a high fidelity audio frequency amplifier system having a separate low frequency and a separate high frequency amplifier channel and a single source of input signal,
a single frequency-dividing input network comprising a resistor,
an inductor reactive element,
and a capacitor reactive element,
said resistor and said elements all connected in one series circuit across said single source of input signal,
one of said reactive elements connected to ground and across the input of a single-ended input amplifier for the separate amplification of one portion of the high fidelity audio spectrum,
only the other of said reactive elements connected across the input of a two-tube differential input amplifier stage
having an impedance in the common input circuit of said two tubes across which said input signal appears for the separate amplification of the remaining portion of said high fidelity audio spectrum;
said dividing network thus connected for operation substantially unloaded to provide
a vectorially-summed constant power output as a function of frequency,
an ultimate 12 decibels per actave roll-off attenuation,
and a 180° constant phase difference
set of parameters.

References Cited in the file of this patent

UNITED STATES PATENTS

| | | |
|---|---|---|
| 2,173,222 | Belar | Sept. 19, 1939 |
| 2,217,839 | Grundmann | Oct. 15, 1940 |
| 2,219,175 | Dome | Oct. 22, 1940 |
| 2,452,499 | Siezen | Oct. 26, 1948 |
| 2,757,244 | Tomcik | July 31, 1956 |
| 2,794,866 | Dert | June 4, 1957 |

FOREIGN PATENTS

| | | |
|---|---|---|
| 111,788 | Australia | Oct. 23, 1940 |

OTHER REFERENCES

Renne: Radio and Television News, December 1949, pp. 64—65.